United States Patent Office 3,024,264
Patented Mar. 6, 1962

3,024,264
SEPARATION OF TRIALKYL BORATE-ALCOHOL MIXTURES
Lowell L. Petterson, Whittier, Calif., assignor to United States Borax & Chemical Corporation, Los Angeles, Calif., a corporation of Nevada
No Drawing. Filed May 16, 1960, Ser. No. 29,146
8 Claims. (Cl. 260—462)

This invention relates to a new and novel process for separating trialkyl borate-alcohol mixtures and has particular reference to the recovery of substantially pure trimethyl and triethyl borate esters from an ester-alcohol mixture.

Separation of substantially pure methyl and ethyl borate esters from mixtures comprising the esters and their respective alcohols has been attempted by various methods involving chemical and distillation techniques; however, these prior art processes have proven difficult and expensive to perform. This is due to the well-known fact that trimethyl and triethyl borate esters form azeotropes with their respective alcohols and which azeotropes have a lower boiling point than either the ester or the alcohol.

It is, therefore, the principal object of the present invention to provide a new and novel method for separating trimethyl and triethyl borate esters from mixtures of such esters with methanol and ethanol, respectively.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

The crux of the present invention is based on my discovery that molecular sieves will selectively adsorb alcohol from an admixture of alcohol and an ester.

Molecular sieves are crystalline sodium and calcium alumino-silicate (also known to those skilled in the art as zeolites) materials whose atoms are arranged in a crystal lattice in such a way that there are a large number of small cavities interconnected by smaller openings or pores of precisely uniform size.

Broadly stated, the present invention comprises the method of obtaining substantially pure ester which comprises passing an admixture of ester and alcohol selected from the group consisting of trimethyl borate-methanol admixture and triethyl borate-ethanol admixture through a column containing a molecular sieve comprising crystalline sodium and calcium alumino-silicates and recovering from the bottom of said column a substantially pure ester selected from the group consisting of trimethyl borate ester and triethyl borate ester.

From the foregoing broadly stated paragraph, it will be seen that the present method needs no complex equipment. The separation of the ester from the azeotrope occurs rapidly, the alcohol being selectively adsorbed by the molecular sieve on contact. When the molecular sieve is saturated with alcohol, it is regenerated by heating the column; the volatilized alcohol is then condensed at the top of the column and is recovered in a receiving vessel.

The method of the present invention is readily adaptable to continuous operation with the use of two or more columns, containing the molecular sieve, placed in parallel. In this manner one column is used until it becomes saturated with alcohol and then the feed stream of ester-alcohol admixture is passed through the second column while the first column is being regenerated. Continually changing columns in this fashion is a simple matter and continuous operation is easily achieved.

So that the present invention can be more easily understood, the following examples are given:

I 71.5 grams of a trimethyl borate-methanol mixture containing 89.1% trimethyl borate ester was passed through a column containing 38.0 grams of the molecular sieve, crystalline sodium and calcium alumino-silicates, at room temperature. The initial recovery was 90.27% yield of substantially pure product. Chemical analysis showed this product to be substantially pure trimethyl borate.

Found: $B=10.31\%$
Theory trimethyl borate: $B=10.41\%$

II

This example is illustrative of a method for continuously producing substantially pure alkyl borate ester from an ester-alcohol azeotrope mixture.

600 grams of a trimethyl borate-methanol mixture containing 75.8% trimethyl borate was prepared. The mixture was fed at a measured rate so that when 100 grams of feed stock has been put through a first column, the feed was transferred to a second column and the first column was regenerated. After 100 grams of mixture was passed through the second column, the feed was moved to a third column and the second column was regenerated. By the time 100 grams of mixture was passed through the third column, the first column was ready for use again and the process was repeated. The initial recovery was a 93.0% yield of substantially pure product. Chemical analysis showed the product to be substantially pure trimethyl borate.

Found: $B=10.34\%$
Theory trimethyl borate: $B=10.41\%$

III 100 grams of triethyl borate-ethanol mixture comprising 80.0% ester was passed through a column containing 100 grams of the molecular sieve at room temperature. The initial recovery was 92.38% of substantially pure triethyl borate ester.

Found: $B=7.39\%$
Theory triethyl borate: $B=7.41\%$

IV

Example II was repeated using 300 grams of a triethyl borate-ethanol mixture comprising 60% triethyl borate. 50 grams were passed through each column before regeneration was started. The initial recovery was 92.56% of substantially pure triethyl borate.

Found: $B=7.33\%$
Theory triethyl borate: $B=7.41\%$

From the foregoing examples it will be seen that the initial recovery of ester is between 90% and 93%. The remaining ester is not lost, however, but is physically entrapped by the molecular sieve and is almost completely recovered with the adsorbed alcohol when the molecular sieve is regenerated. The ester-alcohol which is recovered from the regeneration step can be put in the incoming feed stock and recovered.

It is to be clearly understood that it is immaterial to the present invention as to the percentage of ester in admixture with alcohol that is passed through the molecular sieve. In other words, an admixture comprising 10% ester and 90% alcohol is just as readily separated as an admixture comprising 90% ester and 10% alcohol.

It will be noted that the foregoing description clearly indicates that the present invention can be used for both batch and continuous operations and that no complicated equipment is necessary.

Other modes of applying the principle of the invention may be employed provided the features as stated in the following claims, or the equivalent of such, be employed.

I, therefore, particularly point out and claim as my invention:

1. The method of obtaining substantially pure ester which consists essentially of passing an admixture of ester and alcohol selected from the group consisting of trimethyl borate-methanol admixture and triethyl borate-ethanol admixture through a column containing a molecular sieve consisting essentially of crystalline sodium and calcium alumino-silicates and recovering from the bottom of said column a substantially pure ester selected from the group consisting of trimethyl borate ester and triethyl borate ester.

2. The method of continuously producing substantially pure ester which consists essentially of having at least two columns containing a molecular sieve consisting essentially of crystalline sodium and calcium alumino-silicates, alternately passing an ester-alcohol admixture of claim 1 through one column and collecting from the bottom of said column substantially pure ester while regenerating the molecular sieve in the alternate column.

3. The method of claim 1 which consists essentially of passing said ester-alcohol admixture through said molecular sieve at ambient temperature.

4. The continuous method of claim 2 which consists essentially of passing said ester-alcohol admixture through said molecular sieve at ambient temperature.

5. The method of separating trimethyl borate ester from a trimethyl borate-methanol admixture which consists essentially of passing said trimethyl borate-methanol admixture through a column containing a molecular sieve consisting essentially of crystalline sodium and calcium alumino-silicates and recovering from the bottom of said column substantially pure trimethyl borate ester.

6. The continuous method of separating trimethyl borate ester from a trimethyl borate-methanol admixture which consists essentially of having at least two columns containing a molecular sieve consisting essentially of crystalline sodium and calcium alumino-silicates and alternately passing said trimethyl borate-methanol admixture through one column and collecting from the bottom of said column substantially pure trimethyl borate ester while regenerating the molecular sieve in the alternate column.

7. The method of separating triethyl borate ester from a triethyl borate-ethanol admixture which consists essentially of passing said triethyl borate-ethanol admixture through a column containing a molecular sieve consisting essentially of crystalline sodium and calcium alumino-silicates and recovering from the bottom of said column substantially pure triethyl borate ester.

8. The continuous method of separating triethyl borate ester from a triethyl borate-ethanol admixture which consists essentially of having at least two columns containing a molecular sieve consisting essentially of crystalline sodium and calcium alumino-silicates and alternately passing said triethyl borate-ethanol admixture through one column and collecting from the bottom of said column substantially pure triethyl borate ester while regenerating the molecular sieve in the alternate column.

No references cited.